(12) United States Patent
Nagler

(10) Patent No.: US 6,374,984 B1
(45) Date of Patent: Apr. 23, 2002

(54) METHOD FOR THE AUTOMATED GROUPING OF OBJECTS

(75) Inventor: Peter Nagler, Fellbach (DE)

(73) Assignee: imt robot AG, Fellbach (DE)

( * ) Notice: Subject to any disclaimer, the term of this patent is extended or adjusted under 35 U.S.C. 154(b) by 0 days.

(21) Appl. No.: 09/555,449

(22) PCT Filed: Nov. 25, 1998

(86) PCT No.: PCT/EP98/07586

§ 371 Date: Jul. 31, 2000

§ 102(e) Date: Jul. 31, 2000

(87) PCT Pub. No.: WO99/28057

PCT Pub. Date: Jun. 10, 1999

(30) Foreign Application Priority Data

Nov. 28, 1997 (DE) .......................... 197 52 908

(51) Int. Cl.[7] .............................. B65G 47/24; B07C 5/36
(52) U.S. Cl. .................... 198/382; 198/395; 198/397.06
(58) Field of Search ............................... 209/597, 598, 209/933; 53/531; 414/798.2, 798.4; 901/47; 198/382, 395, 397.06, 400, 401, 418.6, 426, 432; 700/213, 223

(56) References Cited

U.S. PATENT DOCUMENTS

| | | | |
|---|---|---|---|
| 4,107,838 A | * 8/1978 | Keen et al. .................... 29/628 |
| 4,881,635 A | * 11/1989 | Raschke ....................... 198/460 |
| 5,057,055 A | * 10/1991 | Michaud et al. ............... 452/51 |

FOREIGN PATENT DOCUMENTS

| | | |
|---|---|---|
| DE | 44 15 686 | 11/1994 |
| WO | 91 11885 | 8/1991 |
| WO | WO-91-11885 | * 8/1991 |
| WO | 94 20230 | 9/1994 |

* cited by examiner

Primary Examiner—Donald P. Walsh
Assistant Examiner—Joseph C. Rodriguez
(74) Attorney, Agent, or Firm—Gudrun E. Huckett

(57) ABSTRACT

In a method for automated grouping of objects, the objects are randomly placed onto a conveyor belt and transported in a steady conveying flow to a grouping device. A recognition device determines a location and a position of the objects transported on the conveyor belt before reaching the grouping device and communicates the location and the position of the objects to a control unit. The control unit evaluates the random ordered state of the objects on the conveyor belt based on the location and the position of the objects. The control unit determines, based on the evaluation result of the evaluating step, sorting positions on the conveyor belt. The handling device groups, taking into account the belt speed, the objects in a group on each one of the determined sorting positions on the conveyor belt. The groups of objects are then further transported on the conveyor belt.

21 Claims, 1 Drawing Sheet

METHOD FOR THE AUTOMATED GROUPING OF OBJECTS

BACKGROUND OF THE INVENTION

1. Field of the Invention

The invention relates to a method for automated grouping of objects which are placed in a steady conveying flow in random order onto a conveyor belt and transported to a grouping device, wherein a recognition device determines the location and the position of the arriving objects on the conveyor belt and communicates these to a control unit, that takes into account the belt speed, of a handling device which sorts the objects in a grouped ordered state.

2. Description of the Related Art

The automated handling is coordinated by a control unit of the grouping device. A recognition device detects the location and the position of the arriving objects on the conveyor belt and communicates these continuously to the control unit which, taking into account the belt speed, generates control commands for a handling device. In this context it is conventional to determine, based on the recognized location and position of the arriving objects, for each object the virtual footprint position on the conveyor belt in the area of reach of the handling device. Based on the virtual information and the belt speed, the actual location and position of the considered objects is determined in which, upon being moved at the belt speed, they are positioned in the area of reach of the handling device at a predetermined access time. Within its area of reach, the handling device can be advanced to each object and can sort them in the predetermined grouped ordered state onto a further conveyor belt. It is known that also large quantities of randomly supplied objects can be sorted when the handling device removes the objects from the conveyor belt and places them onto a further conveyor belt, i.e., the sorting belt. The handling device compiles the objects on the sorting belt according to a predetermined sorting specification. The objects are then further transported on the sorting belt positioned in groups of the sorted ordered state.

SUMMARY OF THE INVENTION

It is an object of the present invention to provide a method for automated grouping of objects of the aforementioned kind which operates quickly and can be performed with minimal apparatus expenditure.

In accordance with the method of the invention, the objects are grouped on the conveyor belt and further transported thereon, wherein the control unit evaluates the random ordered state on the conveyor belt and determines the location of a group on the conveyor belt.

The invention is based on the recognition that between the randomly arranged objects on the conveyor belt there are surface areas provided which are also randomly positioned and on which sorted objects can be placed in groups. Moreover, by means of the handling of individual objects supplemental surface areas will be freed which subsequently can be used for grouping of further objects. In the inventive method, the control unit evaluates via the detection of the respective location and position of the arriving objects the random ordered state of all objects on the conveyor belt and determines based thereon randomly available sorting positions with sufficient surface area for a respective group. The objects are sorted on the conveyor belt and are farther transported in groups so that the apparatus expenditure that was required up to now for performing the automated grouping method is reduced. In particular, the sorting belt that was required up to now can be eliminated because the conveyor belt itself forms the sorting belt. Moreover, with the method according to the invention, the efficiency of the grouping device is increased because the handling device must travel, on average, short distances for sorting the arriving objects so that the grouping process can be performed quickly.

Advantageously, an object is selected as a recognition object which determines the sorting position, with further objects being sorted next to it according to the predetermined grouping order. The recognition object remains in its original random position on the conveyor belt during sorting so that for the grouping action only the further objects must be handled. The grouping of the objects on the conveyor belt can be performed very quickly because one handling step per group is eliminated, i.e., that of the recognition object.

The further objects of a group can be aligned based on the position of the recognition object. The random location of the recognition object determines the location of the further objects which in the considered group are compiled according to the predetermined correlation specification. The sorted objects are thus respectively positioned within their groups according to the predetermined ordered state in which they are transported to further processing, if needed. The position and the orientation of each group depends on the position and the location of the recognition objects, wherein the groups can also be arranged adjacent to one another on the conveyor belt and the transport efficiency of the conveyor belt can be taken advantage of in this way. The presence of several sorted groups adjacent to one another is probable given the randomness of the orientation so that the available width of the conveyor belt can be fully used.

Advantageously, the control unit processes the randomly ordered state on the conveyor belt such that, if needed, the location of the selected recognition object can be corrected, for example, for providing a situation beneficial for the subsequent grouping. A correction of the location of the selected recognition object via a respective control of the handling device is carried out also when the processing result of the randomly ordered state indicates that the selected recognition object is positioned adjacent to the edge of the conveyor belt and the surface area corresponding to the determined location is insufficient for positioning the predetermined number of further objects of the considered group. Those objects which in the ordered state as supplied are positioned on the conveyor belt with a spacing as minimal as possible to the determined sorting position (recognition object) are advantageously correlated with the respective group so that correspondingly short distances are required of the handling device during sorting.

BRIEF DESCRIPTION OF THE DRAWING

One embodiment of the invention is explained in detail in the following with the aid of the drawing. It is shown in.

DESCRIPTION OF THE PREFERRED EMBODIMENTS

Figure 1:
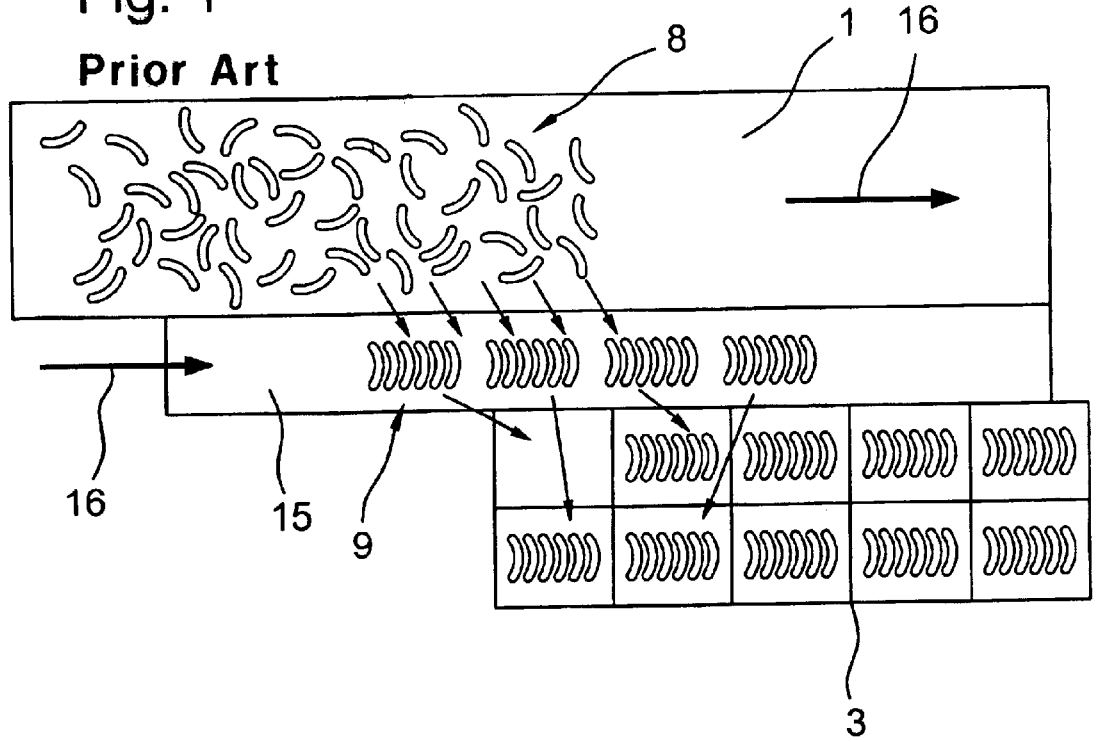
FIG. 1 a schematic representation of an automated grouping of objects according to the prior art.

In the shown embodiment of the invention the objects to be automatically grouped are sausages which after their manufacture are placed onto a conveyor belt I and are to be transported in a grouped ordered state to further processing. After manufacture and a separation process of the connected sausages following the manufacture, the sausages 8 are placed onto the conveyor belt I in random order. The function of the automated grouping of the sausages is to compile the sausages 8 randomly positioned on the conveyor belt in aligned groups of, in the present case, six sausages each so that they can be subsequently packaged to form a sausage package 9. In the grouping according to the prior art illustrated in FIG. 1, the sausages 8 are removed by a handling device from the conveyor belt and are placed onto a conveyor belt 15 moving in the same direction as the conveyor belt 1. In this context, the handling device is programmed or controlled by a control device such that the sausages removed from the conveyor belt 1 are placed onto the sorting belt 15 adjacent to one another in groups with the predetermined number of six sausages. The sausages aligned and arranged in groups are placed by a further handling device onto a packaging machine 3. For the automatic grouping of the sausages, the location and the position of the arriving sausages on the conveyor belts 1 are detected and, taking into account the belt speed, the corresponding footprint position of the individual sausages 8 in the area of reach of the handling device is determined.

Figure 2:
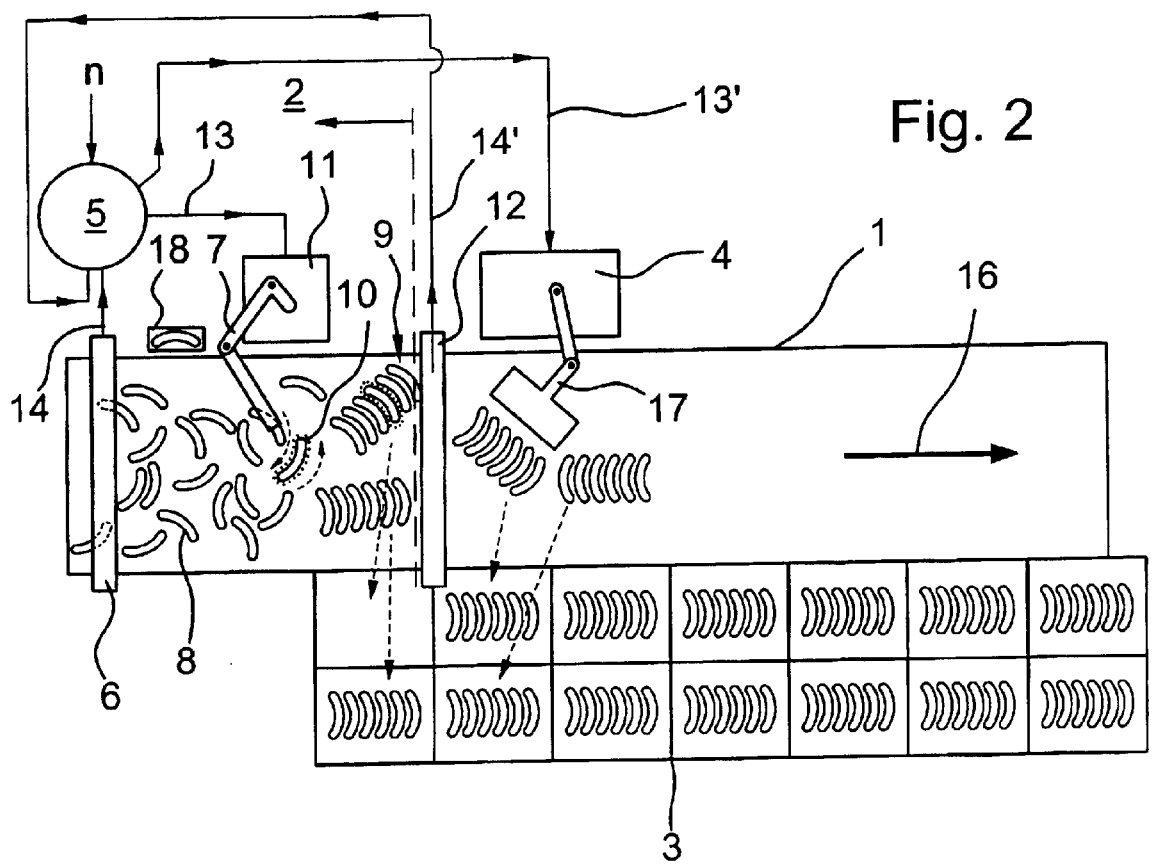
FIG. 2 a grouping device for performing the method according to the invention.

As can be seen in FIG. 2, a grouping device 2 for performing the method according to the invention for an automated grouping of sausages 8 is comprised of a recognition device 6 and a control unit 5 as well as a robot 11 for handling the sausages positioned on the conveyor belt 1. The recognition device 6 detects, for example, by optical means, the location and the position of the arriving sausages 8 on the conveyor belt and communicates its sensor signals 14 to control unit 5. The recognition device 6 works expediently via a transmitted light method, wherein the contours of the objects positioned on the conveyor belt 1 are detected. The control unit 5 generates control signals 13 for a robot 11 for handling the sausages 8 positioned on the conveyor belt I by a handling device 7. Based on the sensor signals 14 of the recognition device 6, the virtual location and position of the individual sausages 8 are determined which, taking into account the belt speed n, can be recalculated to an actual location and position of the sausages 8, moved in the movement direction 16 of the conveyor belt, at certain points in time. When the point in time of accessing a certain sausage 8 is set, the actual location and position of the considered sausage in the area of reach of the robot 11 can be determined at this point in time, based on the virtual information, and this allows the robot to handle this sausage, and any other sausage can be handled in the same way. The belt speed n of the conveyor belt 1 is determined by a speed measuring device, not shown, and is communicated to the control unit 5 for processing the virtual information.

According to the invention, the sausages conveyed in random order to the grouping device 2, in contrast to the prior art illustrated in FIG. 1, are sorted on the conveyor belt 1 into the grouped ordered state and are subsequently further transported on the conveyor belt 1 in the grouped state. In the shown embodiment the grouping of sausages in dense packages of six pieces each in the sorted ordered state is again used as an example. The control unit determines based on the sensor signals 14 of the recognition device 6 the entire ordered state on the conveyor belt 1 and evaluates the random order, wherein randomly provided sorting positions with sufficient surface area for each group are determined. The control unit selects per group one (randomly positioned) sausage as a recognition object 10 which determines the sorting position, wherein five additional sausages are added by sorting. The sausage selected as a recognition object 10 is represented in the drawing with a doted contour. The selection of the sausages suitable as recognition objects is carried out with consideration of the entire ordered state on the conveyor belt 1 in order to ensure that sufficient goods for compilation of a package are present in the surroundings of the object selected as a sorting position. Adjacent to the sausage 10 selected as a sorting position, if needed on both sides, the robot 11 will place five additional sausages, wherein those sausages are correlated with a group whose location and position relative to the corresponding physical recognition object 10 differ as minimally as possible. The grouping process is accelerated by the short transport distances and minimal rotational movement of the handling device for bringing the handled sausage into an aligned position relative to the recognition object. In the grouping correlation, i.e., the compilation of the sausage package on the sorting position, those sausages 8 are preferably sorted to a group whose removal from the original position provides surface area for placement of additional sausages 8 of the same group 9. With such a determination of the sequence of handling, those sausages, which are positioned accidentally partially within the surface area designated for the grouping, are sorted preferredly and are placed against the facing side of the recognition object 10 with a short transport distance so that collisions are excluded and there is always free positioning surface area available on the belt. The sorting, and thus the removal, of those sausages from the original position which are disruptive for the grouping is carried out at a location within the sequence that results randomly from the ordered state, but at the latest in the sorting step which precedes the positioning of a sorted sausage in this position. For the determination of the sequence of the handling steps of the individual sausages, the criteria of the random surface area distribution of the conveyor belt 1 as well as the goal of short transport distances for sorting and also the handling sequence resulting randomly from the spatial arrangement of the sausages are taken into account.

The compilation of a group of six sausages requires only five handling steps because the sausage selected as the recognition object 10 remains in its original location and position on the conveyor belt 1 during sorting. The adjacent placement of further sausages results in free surface area at the upstream portion of the conveyor belt 1 at the location where the respectively handled sausage has been removed, thus allowing sorting of further sausages in the predetermined group arrangement. The position of the sausage selected as the recognition object 10 can be, if needed, corrected when the evaluation result shows that in its original position too little sorting surface area for compilation of a sausage group is provided, for example, on the edge of the conveyor belt 1.

The grouping device 2 comprises a buffer storage device, not shown, into which the handling device 7, if needed, places sausages 8 in the case that the sausages in the random ordered state are positioned clearly isolated and remote from further goods and, when considering the predetermined sorting specification, can be sorted only with great handling expenditure. When such an isolated position of a sausage or a common isolated position of a number of sausages not corresponding to the required number for a group, which position would require complex handling of the sausage resulting in a delay of the continuous grouping process of the unsorted goods, is determined during evaluation of the random ordered state, these goods are intermediately stored in a buffer storage device and are removed occasionally for supplementing a group.

With the inventive method it is also possible to sort large quantities of goods on the conveyor belt 1 because several adjacent sorting positions can be selected on the belt and the conveyor belt can transport the entire quantity of goods, which has been supplied in an unsorted state, in a grouped state. A row arrangement of the sausage packages, as is required in the known method (FIG. 1), which uses only portions of the available space on the conveyor belt 1 and makes it necessary to provide an additional sorting belt, is not employed according to the method of the invention. Instead, the sausage packages 9 compiled during grouping are positioned freely on the surface area of the conveyor belt 1. Their orientation results randomly from the original, i.e. random, location of the sausage selected as the recognition object 10.

The robot 11 can operate in a cascaded manner for increasing efficiency when performing the method according to the invention for grouping sausages.

The freely oriented sausage groups on the conveyor belt 1, transported further and comprised each of six sorted sausages, are removed by a further handling device 17 from the conveyor belt 1 and supplied to a packaging device. The handling device 17 is part of a placing device 4 which removes the grouped sausages on the conveyor belt 1 together and places them into the packaging machine 3. The position and orientation of each sausage group 9 is detected by a further recognition device 12 which communicates a corresponding information signal 14' to the control unit 5. The control unit 5 generates positioning commands 13' for the placing device 4 for gripping the sausage groups 9 positioned in a known position. The control unit 5 in this context coordinates also the controls of multiple placement devices with correspondingly high grouping efficiency. Especially when using a single placing device 4, the position information 14' can also be directly communicated from the recognition device 12 to the placing device 4.

When evaluating the random ordered state of the arriving sausages, it is possible to identify rejects at the same time. The rejected sausages are not taken into consideration for sorting. For example, they can remain on the conveyor belt after removal of the grouped sausage packages and can be collected at the discharge end of the belt.

With the inventive method it is also possible to group objects of different types to form groups with a predetermined combination of the types of objects. In the shown embodiment of sorting sausages, it is also possible to simultaneously sort different types of sausages which are placed together onto the conveyor belt in random order to form groups each comprised of the same type of sausage. Moreover, it is also possible to input one or more group arrangements for grouping the sausages 8 into the control unit 5. In addition to the ordered state illustrated in the embodiment with adjacently positioned sausages 8 in one package, the sausages 8, for example, can be arranged in a circle within a group. In this context, it can be taken into account that those sausages 8 which are positioned outside of a predetermined tolerance frame, i.e., are either too small or too large in comparison to the easily grouped average value, can be correlated to a certain group by means of the control unit 5 at a location determined to be favorable within the grouping process. It is especially expedient to correlate objects that are too small or too large as the last object with a group. Also, the method according to the invention makes it possible to group several types of goods simultaneously and to combine them in product combinations.

Expediently, the control unit 5 can be provided with one or more sorting specifications for grouping the objects 8 based on the location on the conveyor belt determined by the recognition device 6 as well as additionally with a priority specification according to which a sequence for considering the sorting specifications is determined. The control unit determines in this context, while taking into account the sorting specifications, the most favorable sequence of the handling processes with respect to performing sorting as fast as possible with short transport distances of the sausages to be grouped and simple handling steps. One or more desired group arrangements of the finish-sorted sausages can be provided as the sorting specifications in the control unit 5, for example, the sausages can be arranged adjacent to one another, as shown in the embodiment, or can be spatially arranged, i.e., within a group several layers of sausages 8 are grouped atop one another. In an especially advantageous way, preferred locations and positions on the conveyor belt 1 with respect to simple handling steps of the placing device 4 arranged downstream can be input into the control unit 5 as a further sorting criterion. For example, the sausage groups can be aligned in the longitudinal direction or can be placed onto a certain side of the conveyor belt, i.e., on the side where the placing device or placing devices are located.

Before beginning the respective handling steps, the control unit 5 determines, based on the input random ordered state of the sausages 8 on the conveyor belt 1, the sequence of the grouping steps for the individual objects of the total group and selects in this context from several found possibilities the most favorable one with respect to a sorting efficiency of the sorting device that is expediently as high as possible. When one or optionally also several sausages 8 are detected by the control device as being correlatable only with great handling expenditure to one of the currently considered groups, the sausage 8 in question is placed for later removal and grouping into a buffer storage device 18. In an especially expedient way, a total state of the groups which is correlated with the volume of the individual objects within the group, can be provided as a further sorting criterion for the control unit 5. For example, it is thereby possible to sort the sausages 8 or also objects of a different kind according to a predetermined total weight of the group. The control unit 5 determines the volume of each of the supplied sausages based on each contour which is determined by the recognition device 6 at the beginning. Based on the determined dimensions of the sausages, it is possible to draw a conclusion in regard to the respective weight, wherein based on an approximated circular cross-sectional shape of the sausages 8 the recognized width is taken to be identical to the height, i.e., is used as a diameter. The knowledge of the diameter of the respective sausage 8 is also taken into consideration for gripping of the respective sausage in that the handling device can be advanced exactly to the required height for gripping the sausage. In this manner, it is possible to always advance to the required height for gripping the objects, especially for sorting objects with tolerances. In the embodiment of sorting sausages it is thus excluded that in the case of sausages that are too small the handling device will slip and that in the case of sausages that are too large they will be pinched. Moreover, the knowledge of the curvature, the thickness and other dimensions of individual sausages can be taken into account for optimizing the handling movements.

The control unit for the sorting method according to the invention can be provided with a plurality of sorting specifications. Possible is also the consideration of the tool contours of the placing device 4 wherein the groups are brought into a favorable position on the conveyor belt 1 with respect to the kinematics of the placing device 4. The inventive grouping of the objects on the conveyor belt provides the possibility of an anticipatory grouping in order to ensure a constant sorting efficiency. Accordingly, when, for example, mass flows of the objects to be sorted that differ over time are detected on the conveyor belt 1, this can taken into consideration at an early point in time. The control unit reacts in such a case with a corresponding adjustment of the control commands for the robot 11 in order to maintain a continuous sorting operation. The entire grouping efficiency can be further increased in that the repetitive location situations of the sausages 8 on the conveyor belt are detected and the optimal sorting sequence of the individual sausages that has been computed once is saved to be reused later. In addition to the detection of recurring sorting situations, further artificial learning mechanisms can be implemented in the control unit 5 which are based on a statistical evaluation of the sorting processes.

The inventive method for automated grouping of objects can be used for a plurality of commercial goods which arrive on a belt in an unsorted state, such as, for example, other foodstuffs than sausages, plastic parts or metal parts, which are to be supplied to a further processing in a grouped arrangement. The handling device 17 can also be provided for subsequent processing of the objects grouped according to the invention in which the objects are handled in a grouped arrangement other than the one shown in the application according to FIG. 2 where the handling device is a component of the placing device 4 for placing the grouped sausages into the packaging machine 3.

What is claimed is:

1. A method for automated grouping of objects (8), said method comprising the steps of:

randomly placing objects (8) onto a conveyor belt (1) and transporting the objects (8) in a steady conveying flow to a grouping device (2);

determining with a recognition device (6) a location and a position of the objects (8) transported on said conveyor belt (1) upstream of the grouping device (2);

communicating the location and the position of the objects (8) to a control unit (5);

evaluating with the control unit (5), based on the location and the position of the objects (8), a random ordered state of the objects (8) on said conveyor belt (1);

determining with the control unit (5), based on an evaluation result of the evaluating step, sorting positions on said conveyor belt (1);

grouping with the handling device (7), taking into account the belt speed (n), the objects (8) in a group (9) on each one of the determined sorting positions on said conveyor belt (1);

further transporting the groups (9) of the objects (8) on said conveyor belt (1).

2. The method according to claim 1, wherein in the step of grouping the objects (8) of each one of the groups (9) are grouped in a dense packaging.

3. The method according to claim 1, wherein in the step of grouping each one of the groups (9) is arranged according to a predetermined group arrangement of the objects (8) input in the control unit (5).

4. The method according to claim 1, wherein in the step of grouping the objects (8) are arranged with identical orientation within each one of the groups (9).

5. The method according to claim 1, wherein the objects (8) are identical.

6. The method according to claim 1, wherein the objects (8) are objects of different types and wherein in the step of grouping the objects (8) are grouped according to a predeterminable combination of the type of objects (8) within each one of the groups (9).

7. The method according to claim 1, wherein the step of grouping is based on one or more predetermined group arrangements of the objects (8) input in the control unit (5).

8. The method according to claim 1, wherein one of the objects (8) is selected as a recognition object (10) which determines the sorting position and wherein in the step of grouping additional objects (8) are added by sorting according to a predetermined group arrangement of the objects (8).

9. The method according to claim 8, wherein the location of the selected recognition object (2) is correctable.

10. The method according to claim 8, wherein said additional objects (8) are aligned based on the position of the recognition object (10).

11. The method according to claim 8, wherein one or more sorting specifications for grouping the objects (8) based on the location on said conveyor belt (1) detected by the recognition device (6) and a priority specification, according to which the sequence of consideration of the sorting specifications is determined, are considered by the control unit (5) in the step of grouping.

12. The method according to claim 11, wherein in the step of grouping said additional objects (8) for correlation with one of the groups (9) are selected based on the location and position of said additional objects (8) having shortest transport distances and requiring minimal rotational movement for alignment relative to the respective recognition object (10).

13. The method according to claim 12, wherein, for correlating the objects (8) with one of the groups (9), a sequence of handling of the individual objects (8) resulting from the random order on said conveyor belt (10) is taken into consideration.

14. The method according to claim 11, wherein in the step of grouping said additional objects (8) for correlation with one of the groups (9) are selected based on the removal from an original position of the objects (8) on said conveyor belt (1) freeing surface area for arranging said additional objects (8) of the same group (9).

15. The method according to claim 11, further comprising the step of storing the objects (8) in a buffer storage device for later removal and grouping when, under consideration of the sorting specifications, the objects (8) have been recognized as being positioned isolated and remote from one of the currently considered recognition objects (10).

16. The method according to claim 11, wherein in the step of grouping several groups (9) are considered and the control unit (5) correlates the objects (8) to one of the groups (9) according to a predetermined total state of the groups (9).

17. The method according to claim 16, further comprising, prior to the step of grouping, the steps of determining with the recognition device (6) the contour of the objects (8) and determining with the control unit (5), based on the contour, a volume of the objects (8), wherein in the step of grouping the volume is taken into consideration as a grouping criterion.

18. The method according to claim 1, further comprising, after the step of grouping, the step of providing an orientation of the groups (9) to a further handling device (17) for a further processing subsequent to grouping.

19. The method according to claim 18, wherein the step of providing comprises detecting the orientation of the groups (9) by a further recognition device (12).

20. The method according to claim 18, wherein the objects (8) are handled as the groups (9) during the further processing.

21. The method according to claim 18, wherein the further handling device (17) removes the groups (9) from said conveyor belt (1).

* * * * *